United States Patent

Lopacki

[11] 3,975,830
[45] Aug. 24, 1976

[54] CENTERING TOOL

[75] Inventor: Edwin Francis Lopacki, Tuscaloosa, Ala.

[73] Assignee: The B. F. Goodrich Company, Akron, Ohio

[22] Filed: Aug. 13, 1975

[21] Appl. No.: 604,329

[52] U.S. Cl. .................... 33/191; 33/103; 33/181 R
[51] Int. Cl.² .......................... G01B 3/00
[58] Field of Search .......... 33/103, 180 R, 180 AT, 33/181 R, 181 AT, 191

[56] References Cited
UNITED STATES PATENTS

| 1,274,647 | 8/1918 | Whipple | 33/191 |
| 2,505,897 | 5/1950 | Hoffman | 33/180 R |

FOREIGN PATENTS OR APPLICATIONS

| 495,723 | 8/1954 | Italy | 33/191 |
| 509,995 | 8/1955 | Italy | 33/191 |

Primary Examiner—Richard E. Aegerter
Assistant Examiner—Richard R. Stearns
Attorney, Agent, or Firm—Joseph Januszkiewicz; W. A. Shira, Jr.

[57] ABSTRACT

A centering tool composed of two symmetrical plate members that are slidably connected together. The one member is mounted on one rim flange of a machine with a linear reference edge on the other rim flange. The other member is mounted on the other rim flange with its linear reference edge on the one rim flange. Both plate members have second intersecting edges that define a center of the rim flanges at their juncture.

12 Claims, 4 Drawing Figures

CENTERING TOOL

BACKGROUND OF THE INVENTION

This invention relates to an alignment tool and more particularly to a tool for finding the center of the spaced flanges of a tire building drum which center is on the plane of the perpendicular bisector of the axis of the spaced flanges.

The manufacture of pneumatic tires based on the one stage process or the two stage process (which involves the transferring of a partially built carcass from a first machine to a shaping machine), requires the utilization of a pair of spaced rim flanges. The tire built on the single stage process is fabricated completely on a single tire building drum. In both processes, it is essential that the rim flanges be accurately positioned relatively to each other and the reference point on the machine from which measurements are taken for the tire drum, belts and tread. As the tire is built, the bead portions are supported by the respective rim flanges and the material is placed onto the tire drum including liners, flipper strips, sidewalls, belts and tread. During this construction process, it is essential to center the materials as much as is practical to distribute the material evenly on the tire carcass. As an aid in this construction process, belt guides, centering rings and centerlines are used. Often times, treads and belt materials have centerlines inscribed thereon to facilitate their accurate placement onto the tire carcass. Further, to increase accuracy, projection lights are mounted above the tire machine to project a line onto the tire building drum and the material thereon. In this instance, measurements are made from the projection line and adjustments are made to the rim flanges to assure that the projected line is the centerline of the drum. Alternatively, with the aid of a tape measure, adjustments are made of the rim flanges and the location of the light and its projection. This procedure must be repeated when changing drum sizes to accommodate changes in specification for different tire sizes. The present invention provides a simple centering tool which accurately and quickly defines the center of the flanges. Such centering tool provides rapid means for checking the alignment and positioning of the projector light line. The centering tool provides facile means for accurate focusing the light beam since the point at which the light beam strikes the center position on the tool is automatically adjusted to the height of the material on the drum; since the reference edges intersect at different heights in accordance with the width of the drum and the slope of the reference edges. Such centering tool is inexpensive to make, simple in construction and light weight and is self-aligning to eliminate errors. The fabrication of this tool is simple since two symmetrical pieces of plate can be machined simultaneously and then assembled back to back for use.

SUMMARY OF THE INVENTION

The present invention contemplates a centering tool for use with spaced flanges of a tire building drum which locates the centerline therebetween. The tool is composed of a pair of flat plates having their respective one edges notched or recessed for placement on the respective spaced flanges. Each member has a reference edge that slidingly contacts the opposing rim flange spaced from the notch. Such notches and reference edges define a line that is tangent to the rim flanges. In addition, each member has a second reference edge that cooperates with the second reference edge of the opposing member such that their intersection is a point, which point is in a plane that is the perpendicular bisector of the axis of the rim flanges. A light located above the rim flanges can be accurately located to project its beam on the center point of the pair of flat plates, which projected beam can thereafter be used to project its beam on tire building material being placed on the drum to accurately align the centerline thereon, or to align supporting equipment such as material trays, belt guide rings, or stitching devices.

DETAILED DESCRIPTION

Figure 1:
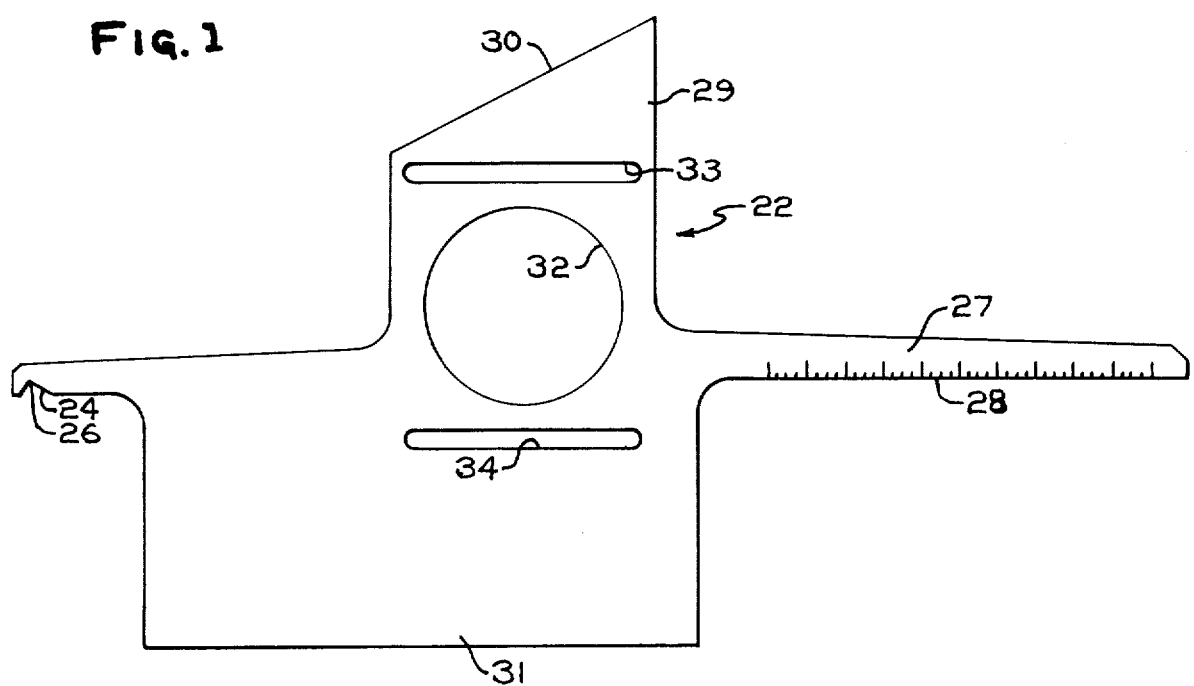
FIG. 1 is a front elevational view of one member of a centering tool.
Figure 2:
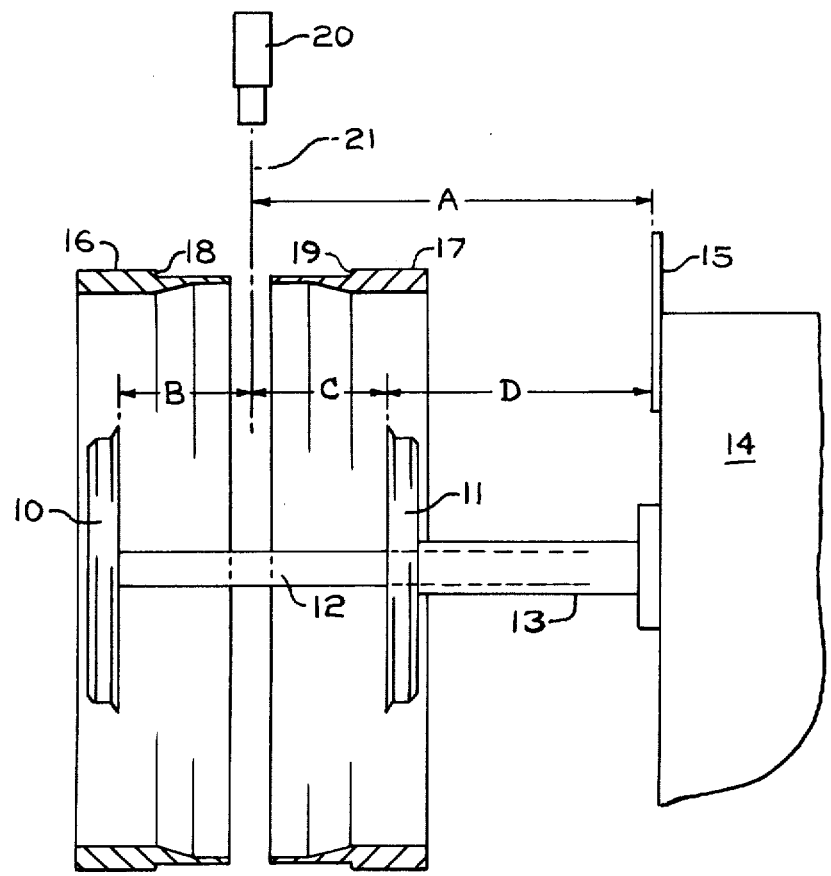
FIG. 2 is a front elevational view of the tire building flange portion of a tire building machine with the belt applying rings shown in cross-section and a line projection light positioned thereabove.

Referring to the drawings, wherein like reference characters designate like or corresponding parts throughout the several views, there is shown in FIG. 2 a pair of spaced rim flanges 10 and 11 suitably journaled on shafts 12 and 13 respectively with shaft 12 slidingly received by shaft 13. Such shaft 12 and 13 are suitably driven by transmission mean located in the housing 14 of the tire building machine. Housing 14 has a reference plate 15 suitably mounted thereon from which measurement may be taken to locate the rim flanges and other accessory parts of the tire building machine. Spaced belt flanges 16 and 17 which are suitably axially movable toward and away from each other are recessed as at 18 and 19 to accurately position a belt onto the tire carcass being fabricated. A light source 20 suitably adjustable is mounted above the tire building machine to project a light beam 21 onto the tire drum with material thereon to center such material during the building of a tire.

Figure 3:
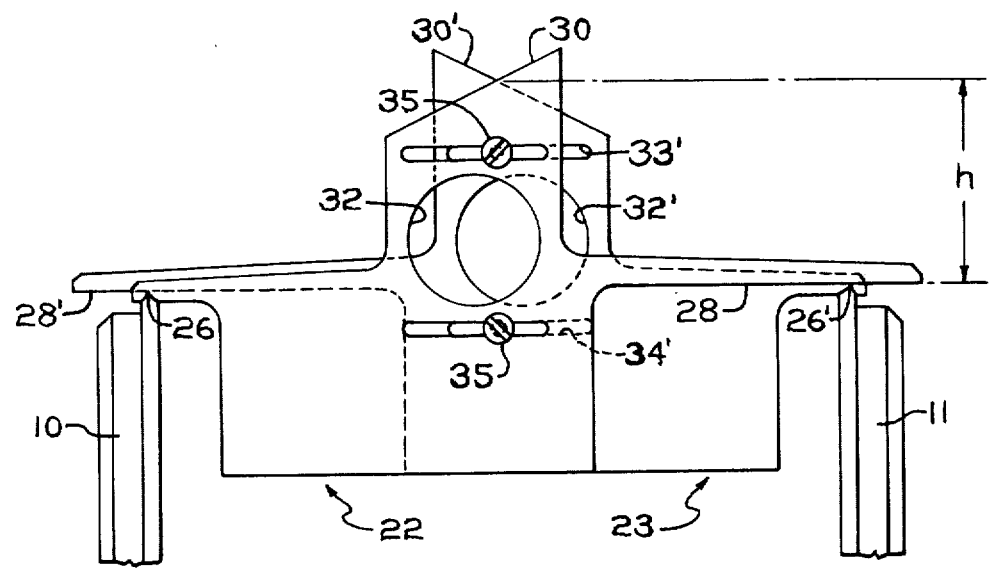
FIG. 3 is a front elevational view of the centering tool composed of two members as disclosed in FIG. 1 positioned on tire building flanges.

The centering tool comprises a pair of flat plate members 22 and 23 (FIG. 3) having flat planar surfaces that are adapted to slidingly abut each other. The respective plate members are identical in shape except that they are placed back to back, therefore only one member 22 will be described with corresponding parts in the other plate member 23 being primed. The specific shape is not critical except as designated in the description. Plate member 22 has one end portion recessed or notched as at 24 such that the uppermost point of the apex 26 of such recess will rest on the uppermost portion of the rim flange 10. Plate member 22 has a projection 27 extending in the opposite direction from the recess 24 and having its lower edge forming a reference edge 28. The extension of reference edge 28 would intersect apex 26. Plate member 22 has an upwardly extending portion 29 which has a reference edge 30 sloping downward toward the recess 24. To provide stability to the centering tool as the recess 24 rests on the rim flange 10, the reference edge 28 rests on the rim flange 11. The lower portion 31 of plate member 22 extends downwardly below the projection 27 to provide a counterweight thereto. Plate member 22 has an enlarged bore 32 in the mid-portion thereof to lighten the total weight and increase the stability of the centering tool in its use. A pair of horizontally extending slots 33 and 34 are provided in the body of plate members 22 and 23 (33' and 34') such that as plate members 22 and 23 are assembled in back to back relationship, the slots 33 and 34 of plate member 22 are aligned with the corresponding slots 33' and 34' of plate member 23 so that bolts 35 interconnect such plate members into a unitary centering tool. Such interconnecting means as bolts 35 and slots 33, 34, 33' and 34' permit limited rectilinear movement between the plate members in accordance with the spacing between the rim flanges 10 and 11 to permit the respective reference edges 30 and 30' to accurately find the center between the flanges. The one reference edge 28 may be omitted and reliance may be had on the interconnecting means to maintain alignment of parts with the respective notches on the rim flanges. This may be in the form of a guideway, which in effect is the slots 33 and 34 along with bolts 35.

Figure 4:
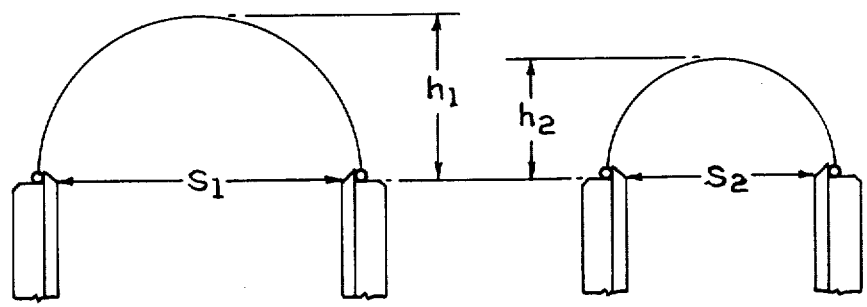
FIG. 4 is schematic showing of tire building flanges illustrating a height to width ratio of tires.

With the rim flanges 10 and 11 spaced from each other, and it being desirable to locate the center therebetween, so that the light source 20 may be properly positioned, the centering tool is placed on the flanges with notch 26 resting on flange 10, reference edge 28 resting on flange 11, notch 26' resting on flange 11 and reference edge 28' resting on flange 10. In this condition, the respective slanted reference edges 30 and 30' of plate members 22 and 23 intersect along their edges to define the center point of the rim flanges 10 and 11 upon which the light source 20 can project its beam of light. By properly selecting the height $h$ designed in FIG. 3, the focus of the light can be precisely adjusted for any given set of ranges of a tire. As an example of this for radial passenger tires, the height ($h_1$ and $h_2$, FIG. 4) to width ($S_1$ and $S_2$) ratio can be set so as to permit the focus of the light to be controlled and thereby placing material on such formed carcass with centerline thereon can be guided accurately. The inflating of the tire and bringing the flanges toward each other is referred to as "forming in" and with such centering tool properly proportioned, the operator can more accurately build a tire carcass. With such centering tool, the operator's skill to center the light and the corresponding materials is not dependent on scales or numbers. By properly centering the light source and its focus and resolution, the operator is better able to line up the rim flanges, belt rings, treads, belts and sidewalls.

As a modification of the existing centering tool, the respective projections 27 of the plate members 22 and 23 may be provided with a scale or indicia thereon which could be used as an aid in setting up the tire building machine flanges to provide for the correct spacing, which in turn depends on the tire specifications.

It will be apparent that, although a specific embodiment and certain modifications of the invention have been described in detail, the invention is not limited to the specifically illustrated and described constructions since variations may be made without departing from the principles of the invention.

I claim:

1. A centering tool for locating the center between a pair of spaced rim falnges of a tire building machine comprising a pair of members, each member having at least one flat surface with portions of said surfaces being in sliding and abutting contact with each other, each of said members having one reference point and a linear reference edge in alignment with said reference point, means interconnecting said members to permit limited linear sliding movement therebetween on said flat surfaces in a direction parallel to said linear reference edge and to locate one of said reference points on one of said rim flanges and the other one of said reference points on the other of said rim flanges, said interconnecting means maintains said reference points and said reference edges on a linear reference line that is parallel to the axis of and intersects the outer edge of said spaced rim flanges, each of said members having a second reference edge that upon a projected extension intersects the extension of said linear reference line and makes an acute included angle therewith, and said interconnecting means maintains the juncture of said second reference edges at a point contact.

2. A centering tool as set forth in claim 1, wherein said interconnecting means includes elongated slot means in each of said members, and bolt means located in said slot means interconnecting said members for adjustment of said members.

3. A centering tool as set forth in claim 2, wherein each of said members has an upper portion and a lower portion, said second reference edge located in said upper portion, each of said members having a depending counter-weight portion in said lower portion for maintaining said tool in an upright position.

4. A centering tool as set forth in claim 3, wherein each of said members has a bore extending therethrough reducing the weight of said members.

5. A centering tool as set forth in claim 4, wherein each of said reference points is defined by a notch complimentary to said rim flange for seating thereon.

6. A centering tool as set forth in claim 5, wherein each of said members is symmetrical with respect to each other.

7. A centering tool as set forth in claim 6, wherein each of said members adjacent to said first mentioned linear reference edges that defines said linear reference line have indicia thereon.

8. A centering tool as set forth in claim 1, wherein each of said first mentioned linear reference edges have indicia thereon.

9. A centering tool for locating the center between a pair of spaced rim flanges of a tire building machine comprising a pair of flat plate members, each of said members having at least one flat surface with portions thereof abutting each other in sliding contact, each of said members having one recess defining an apex, the apexes of said recesses lying on a common linear line that is parallel to the axis of and intersecting the outer edge of said rim flanges, means interconnecting said members to permit limited linear movement therebetween in a direction parallel to said common linear line and to locate one of said recesses on one of said rim flanges and the other one of said recesses on the other of said rim flanges, each of said members having a reference edge that lies at an acute angle relative to said common linear line and the intersecting juncture of said reference edges provides the center of said flanges and cooperates with a beam projected from a light source from above to center said light beam upon said juncture and project a line image thereon.

10. A centering tool as set forth in claim 9, wherein each of said members has an upper portion and a lower portion, each of said upper portions has one of said second reference edges located thereon, and each of said lower portions has a counterweight thereon defining a weighted portion.

11. A centering tool as set forth in claim 9, wherein each plate member has its said reference edge sloping downwardly toward said recess located thereon.

12. A centering tool as set forth in claim 9, wherein said interconnecting means is a guideway on one member engaging a guide on the other member to maintain said plate members in linear alignment on relative movement to each other.

* * * * *